United States Patent
Franzius et al.

(10) Patent No.: US 8,731,719 B2
(45) Date of Patent: May 20, 2014

(54) ROBOT WITH VISION-BASED 3D SHAPE RECOGNITION

(75) Inventors: Mathias Franzius, Offenbach (DE); Heiko Wersing, Frankfurt (DE)

(73) Assignee: Honda Research Institute Europe GmbH, Offenbach (DE)

( * ) Notice: Subject to any disclaimer, the term of this patent is extended or adjusted under 35 U.S.C. 154(b) by 343 days.

(21) Appl. No.: 12/774,333

(22) Filed: May 5, 2010

(65) Prior Publication Data

US 2010/0286827 A1    Nov. 11, 2010

(30) Foreign Application Priority Data

May 8, 2009  (EP) .................................... 09159753

(51) Int. Cl.
| | | |
|---|---|---|
| *G06T 7/00* | (2006.01) | |
| *G05B 15/00* | (2006.01) | |
| *B25J 13/08* | (2006.01) | |
| *G06F 19/00* | (2011.01) | |
| *G06K 9/36* | (2006.01) | |
| *G06K 9/66* | (2006.01) | |

(52) U.S. Cl.
USPC ........... 700/259; 700/245; 382/154; 382/159; 382/190; 382/225; 382/285

(58) Field of Classification Search
None
See application file for complete search history.

(56) References Cited

U.S. PATENT DOCUMENTS

| | | | | |
|---|---|---|---|---|
| 4,731,860 A | * | 3/1988 | Wahl ............................. | 382/281 |
| 6,760,488 B1 | * | 7/2004 | Moura et al. .................. | 382/285 |
| 7,253,832 B2 | * | 8/2007 | Iwaki et al. .................... | 348/50 |
| 8,244,044 B2 | * | 8/2012 | Hua et al. ...................... | 382/224 |
| 2005/0149360 A1 | * | 7/2005 | Galperin ......................... | 705/2 |
| 2006/0008151 A1 | * | 1/2006 | Lin et al. ....................... | 382/190 |
| 2008/0118143 A1 | * | 5/2008 | Gordon et al. ................ | 382/154 |
| 2009/0022367 A1 | * | 1/2009 | Sasaki ............................ | 382/103 |
| 2009/0037033 A1 | * | 2/2009 | Phillips et al. .................. | 701/2 |
| 2009/0096790 A1 | * | 4/2009 | Wiedemann et al. ......... | 345/427 |
| 2009/0274377 A1 | * | 11/2009 | Kweon et al. ................ | 382/225 |
| 2010/0013832 A1 | * | 1/2010 | Xiao et al. .................... | 345/420 |
| 2010/0172555 A1 | * | 7/2010 | Hasezawa et al. ............ | 382/128 |

FOREIGN PATENT DOCUMENTS

WO     WO 2007/055359     *    5/2007

OTHER PUBLICATIONS

English machine translation of WO 2007-055359.*
EP Communication, European Search Report, Sep. 29, 2009, a total of 8 pages.
Franzius et al., Invariant Object Recognition with Slow Feature Analysis, vol. 5163, Sep. 3, 2008, pp. 961-970.
Wolfgang Einhauser, Learning viewpoint invariant object representations using a temporal coherence principle, Biological Cybernetics, vol. 93, Jul. 1, 20005, pp. 79-90.
Murase et al., Visual Learning and Recognition of 3-D Objects from Appearance, vol. 14, No. 1, Jan. 1, 1995, pp. 5-24.

(Continued)

*Primary Examiner* — Fadey Jabr
*Assistant Examiner* — Kevin P Mahne
(74) *Attorney, Agent, or Firm* — Squire Sanders (US) LLP

(57) ABSTRACT

The invention relates to a method for processing video signals from a video sensor, in order to extract 3d shape information about objects represented in the video signals, the method comprising the following steps:
providing a memory in which objects are stored in a 3d shape space, the shape space being an abstract feature space encoding the objects' 3d shape properties, and
mapping a 2d video signal representation of an object in the shape space, the coordinates of the object in the shape space indicating the object's 3d shape.

5 Claims, 1 Drawing Sheet

(56) References Cited

OTHER PUBLICATIONS

Figure 1:
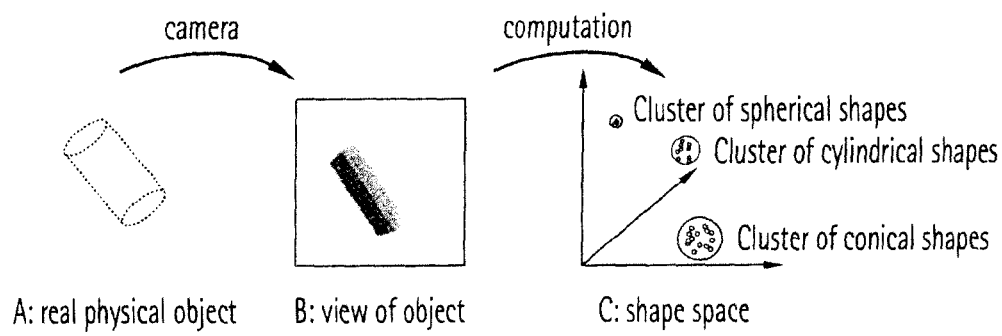

Franzius et al., Slowness and Sparseness Lead to Place, Head-Direction, and Spatial-View Cells, vol. 3, No. 8, Aug. 2007, pp. 1605-1622.

Raytchev et al., Unsupervised recognition of multi-view face sequences based on pairwise clustering with attraction and repulsion Jul. 1, 2003, pp. 22-52.

Becker, Suzanna "Implicit Learning in 3D Object Recognition: The Importance of Temporal Context", Neural Computation, Manuscript No. 1591, Aug. 27, 1998, pp. 1-30.

Berkes, Pietro et al., "Slow Feature Analysis Yields a Rich Repertoire of Complex Cell Properties", Journal of Vision, 2005, pp. 1-30.

Biederman, Irving "Recognition-by-Components: A Theory of Human Image Understanding", Psychological Review, vol. 94, No. 2, 1987, pp. 115-147.

Durou, Jean-Denis "A Survey of Numerical Methods for Shape from Shading", 2004, 41 pages.

Einhauser, Wolfgang et al., "Learning Viewpoint Invariant Object Representations Using a Temporal Coherence Principle", Biol Cybern 93, 2005, pp. 79-90.

Foldiak, Peter et al., "Learning Invariance From Transformation Sequences", Neural Computation 3, 1991, pp. 194-200.

Franzius, Mathias et al., "Slowness and Sparseness Lead to Place, Head-Direction, and Spatial-View Cells", PLOS Computational Biology, vol. 3, Issue 8, Aug. 2007, pp. 1605-1622.

Franzius, M., "Invariant Object Recognition with Slow Feature Analysis", Institute for Theoretical Biology, 2008, pp. 961-970.

Hashimoto, Wakako "Quadratic Forms in Natural Images", Network: Computation in Neural Systems, vol. 14, No. 4, (Abstract), 2003, 1 page.

Kayser, Christoph et al., "Extracting Slow Subspaces from Natural Videos Leads to Complex Cells", 2001, pp. 1075-1080.

Sprekeler, Henning et al., "Slowness: An Objective for Spike-Timing-Dependent Plasticity?", PLoS Computational Biology, vol. 3, Issue 6, Jun. 2007, pp. 1136-1148.

Stringer, Simon et al., "Invariant Object Recognition in the Visual System with Novel Views of 3D Objects", Neural Computation, vol. 14, 2002, pp. 2585-2596.

Wallis, G. et al., "Invariant face and Object Recognition in the Visual System", Progress in Neurobiology, vol. 51, 1997, pp. 167-194.

Wiskott, Laurenz et al., "Slow Feature Analysis: Unsupervised Learning of Invariances", Neural Computation, vol. 14, 2002, pp. 1-49.

Murase, Hiroshi et al., "Visual Learning and Recognition of 3-D Objects from Appearance", International Journal of Computer Vision, vol. 14, 1995, pp. 5-24.

Raytchev, Bisser et al., "Unsupervised Recognition of Multi-View Face Sequences Based on Pairwise Clustering with Attraction and Repulsion", Computer Vision and Image Understanding, vol. 91, Issue 1-2, Jul. 2003, pp. 1-5.

\* cited by examiner

ROBOT WITH VISION-BASED 3D SHAPE RECOGNITION

The present invention generally relates to the field of processing vision signals, i.e. signals supplied from a video or still camera. The invention especially relates to the use of such image processing for recognizing the 3d shape (or physical properties derived therefrom, such as e.g. friction coefficient) of an object present in the input field of the camera.

Such 3d shape recognition may typically find application for robots having object manipulating actuators or other automated object-handling machines, which are thus enabled to adapt their behavior, especially the operation of a object manipulator (gripping force, gripping direction, . . . ) based on the recognized 3d shape of the object. In addition the robot or other machine may deduce secondary features (weight, fragility, rigidity, stiffness, . . . ) of the object from the recognized 3d shape of the object and correspondingly adapt its behavior to such secondary feature (the 3d shape of the object being the primary feature).

The geometry of an object's surface, i.e., its shape, is a relevant information for interacting with the environment, as it determines the physical properties of an object to a large degree. Specifically, shape influences an object's affordance, i.e., what it can be used for. Although the estimation of object shape from its two-dimensional projection onto the eye is hard and generally ambiguous, humans are exceptionally good at estimating an object's shape even from a single view. Furthermore, humans can also often easily estimate an object's physical properties and affordances from such a view.

PRIOR ART

In general, the reconstruction of 3d shape from a single 2d image is ill-posed, because many 3d shapes can produce the same 2d view. As a trivial example, a flat 2d circle textured with a photo of a shaded 3d sphere can produce the same view as the sphere itself. Nevertheless, humans demonstrate that the process is feasible for most everyday situations. A vast amount of research on shape recognition is available, all focusing on specific subproblems. To our knowledge, however, no publications are available on the topic how view-invariant clusters relate in a shape feature space and how they could be used to characterize 3d shape. Furthermore, we focus on approaches that operate with a single (monocular) 2d view and without the requirement of defined camera and lighting properties, which potentially makes the system smaller, more robust, and more flexible.

The straight-forward "engineering" approach to solve the shape reconstruction problem would be to manually identify informative features in the input (i.e., pixel) space for a specific application scenario and subsequently identify combinations of these features to characterize individual shapes. It is not at all guaranteed that such an approach would work even for very restricted environments, as invariant object recognition by itself is very hard already. Further disadvantage of such a specifically tailored solution include the required work to find relevant features for each case, and no obvious generalization abilities to untrained shapes.

One class of approaches is, as ours, based on optimization of the slowness principle (Wallis 1997; Becker 1999; Stringer 2002; Einhauser 2005; Stringer 2006; Franzius 2009). The focus of these approaches is on invariant object recognition under a number of transformations, including pose and lighting changes. Franzius 2009 additionally show how view-invariant object recognition can be combined with object pose estimation. All these approaches, however, do not consider a general shape space as proposed by the invention.

Another class of approaches, called "shape from X" (SFX), tries to reconstruct a mesh representation of a surface from an intensity image (Durou 2008). These approaches include shape from shading (SFS), shape from Texture (SFT) and shape from line drawings (SFL). Typically, these approaches require specific light source and surface reflection properties. Whereas SFX approaches aim at reconstructing the 3d object surface that caused the 2d view explicitly, our approach aims at characterizing the holistic 3d shape independently of its pose. The assumptions of the SFX approaches regarding surface and lighting properties have to be explicitly encoded, whereas our approach extracts the relevant aspects of the surface properties of the training data during the unsupervised learning phase. Opposed to SFX approaches, recognition in our approach is computationally highly efficient as recognition only affords a single forward pass. In contrast to a full 3d mesh representation, an activation pattern in shape feature space is much more compact and implements a meaningful similarity measure between 3d shapes, whereas such a measure is nontrivial to find for a reconstructed 3d mesh.

Document "Invariant Object Recognition with Slow Feature Analysis" by M. Franzius et al describes principles of slow feature analysis partially recited herein.

Document "Learning Viewpoint Invariant Object Representations Using a Temporal Coherence Principle" by W. Einhäuser et al describes how to use unsupervised clustering for a categorization of complex cells and object cells. The method described is able to provide a classification performance measurement which tells to which level a classification of a specific amount of objects is successful or not. The number of clusters used for the classification has to match the number of objects to be classified and each cluster has to be assigned to an object the clustering performance measurement simply tells the fraction of correctly classified test patterns.

Document "Visual Learning and Recognition of 3D Objects from Appearance" by H. Murase et al described how the protection of an object to an eigenspace changes under variations in e.g. lightning. The distance between two points in the eigenspace is a measure of correlation between corresponding brightness images.

It is the object of the present invention to propose an improved technique for gaining 3d shape information of objects from a 2d vision signal.

This object is achieved by means of the features of the independent claims. The dependent claims develop further the central idea of the present invention.

The invention proposes an unsupervised learning method, which is able to recognize three-dimensional objects that have been freely rotated in space from single views. E.g. two geon-like input classes can be used: rendered objects and videos of objects presented to a camera. The unsupervised learning system clusters objects of similar shape independently of viewing angle and generalizes to previously unseen shapes that result from 3d-morphing between the training objects. This generalization performance suggests that the learned feature space is a parametrization of a more general shape space in which geometric shape properties are encoded instead of view-specific features. Such a shape representation is a necessary basis for affordance-based representations, having great potential for automated object manipulation in robotic systems.

A first aspect of the invention relates to a method for processing video signals from a video sensor, in order to extract 3d shape information (or at least one property, such as e.g. the friction coefficient, which is derived from the 3d shape) about objects represented in the video signals, the method comprising the following steps:

provide a memory in which objects are stored in a 3d shape space, the shape space being an abstract feature space encoding the objects' 3d shape properties, and mapping a 2d video signal representation of an object in the shape space, the coordinates of the object in the shape space indicating the object's 3d shape (or physical property derived therefrom).

2d video signals and additionally depth information on the position of objects relative to the video sensor can be supplied.

Signals from a video sensor (i.e., a sequence of images) usually have a number of color channels with a spatial layout of (width×height) with a number of image planes, for example (640*480*3). Instead of, or additionally to such image planes, depth maps can be used if they are scaled to have the same spatial resolution. Depth maps are typically generated with a stereo camera setup and cross-correlation based depth estimation. After appropriate scaling, the depth map would then be used as an alternative input (width*height*1) or additionally (width*height*4) for the case of RGB inputs.

The invention also relates to the use of a method according to any of the preceding claims in order to control a mechanical actuator manipulating an object dependent on the thus gained information on the object's shape.

A further aspect of the invention relates to a computing unit for an autonomous robot, being designed to perform a method according to any of the preceding claims.

The invention furthermore proposes an autonomous robot, being provided with at least one video sensor providing video signals to a computing unit, the computing unit controlling a mechanical object manipulator of the robot.

A still further aspect relates to an unsupervised learning method for setting up a computing system able to extract information on the 3d shape of objects on the basis of video signals representing said objects, the method comprising the following steps:

presenting in the input field of a 2d video camera training objects respectively in different rotational positions or the trajectory of an object upon a defined motion-inducing stimulus, extracting slowly varying features of the training objects and clustering the extracted features in order to parameterize a shape space representation of the training objects, the shape space being an abstract feature space encoding the objects' 3d shape properties.

In yet another aspect the invention proposes a method for processing video signals from a video sensor comprising the steps of:

providing a shape feature space in a memory structure, presenting to the video sensor training objects in different positions or a trajectory of an object for setting up the shape feature space, extracting at least one feature form each training object, calculating feature clusters from the extracted features in the shape feature space, so that different views of the same object produce similar features belonging to one cluster, while similar views of distinct objects are separated, identifying the feature cluster centers, obtaining a view of an object from a video signal, mapping the view of the object to the shape feature space, the coordinates of the object in the shape feature space indicating the object's shape, and characterizing the object's shape as a shape similarity represented by distances to the feature cluster centers.

In still a further aspect, the method of claim 1, comprising further the step of:

extracting slowly varying features of different rotational views of the training objects and clustering the extracted features in order to parameterize the shape feature space representation of the training objects, the shape feature space being an abstract feature space encoding the objects' 3d shape properties.

Known methods already established ways to learn view-invariant object representations. In short, the new and innovative aspects of this proposition are:

In contrast to most state of the art approaches, the system performs no explicit modeling of shape as a mesh but implements a direct abstraction from 2d to shape space, which is simpler and more efficient representation for manipulation of the object by a robotic system.

The system generates a generalized shape feature space for characterization and comparison of 3d shape from a single (monocular) 2d camera view. Earlier approaches did not consider the relationships between view-invariant clusters for characterizing shape from views of arbitrary 3d objects. Distances of activation patterns in shape space implement a similarity measure for 3d shapes.

The system allows the efficient integration of unsupervised vision-based and supervised vision-based or other object properties. Thus, the generated representations can implement a meaningful similarity measure based on vision and non-vision data. Only little supervised data is necessary for learning.

The system can use information from movement statistics of objects induced by their physical properties (e.g., shape, friction) to autonomously generate representations of these properties, which are highly relevant for learning how to efficiently interact with physical objects.

Other than previously presented methods, the invention does not aims at a method for invariant object recognition. Instead, the invention uses distances in the computed features space for more than object identification, i.e., to use distances in this feature space to characterize graded physical properties like similarity of object shape.

Further features, objects and advantages procured by the invention will become evident to the skilled person when reading the following detailed description of an embodiment of the present invention when taken in conjunction with the figures of the enclosed drawings.

FIG. 1: Process overview. A: a physical three-dimensional object is moved in front of a camera. B: a camera takes a view of the object. C: Based on a temporal sequence of views and optimization of the slowness objective, a feature representation is computed. Given certain constraints (e.g., the type of the object's movement trajectory), this feature space has the characteristics of a generic shape space, i.e., different views of objects with the same shape elicit activations within a compact cluster of the feature space, independently of the object's pose and appearance (e.g., caused by object texture). Views of a different object of highly different shape cluster in a different region of shape space. Views of objects with intermediate shape cluster in between. Axes depict slowest outputs $y_1$, $y_2$, $y_3$. The clustering properties in this figure, are especially evident for the axes with the slowest features. In the SFA implementations of the slowness optimization, these are the first N outputs of SFA.

Figure 2:
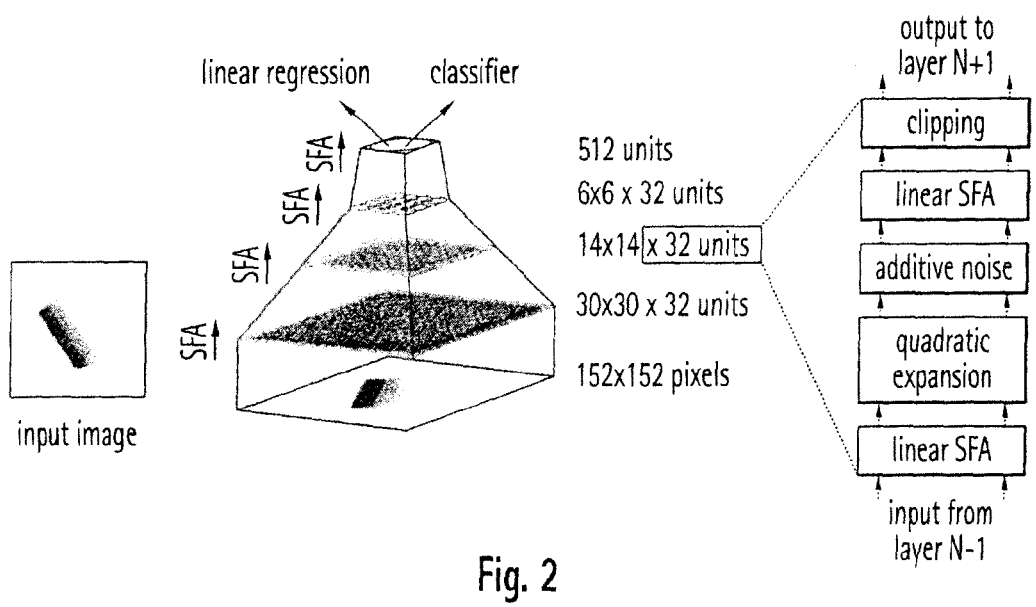

FIG. 2 Model architecture and stimuli. An input image is fed into the hierarchical network. The circles in each layer denote the overlapping receptive fields and converge towards the top layer. The same set of steps is applied on each layer, which is visualized on the right hand side.

TERMINOLOGY

Object: An arbitrary three-dimensional physical entity with a certain visual appearance, which is determined by its shape, and surface reflection properties (e.g., color, reflectiveness, texture).

Shape, 3D shape: Shape is the geometry of an object's surface. Shape is independent of purely optical surface properties like color.

View: A view of an object is the two-dimensional projection of the object with certain distance, rotational angle, and lighting conditions. A camera or the eye can produce views of objects.

Shape space: An abstract n-dimensional feature space that encodes an object's shape properties and little or no view properties. The shape space in the sense laid of the invention, is invariant to appearance variations induced by pose and lighting changes. In such a space, the object trajectories of the model described e.g. by Murase will collapse into compact clusters. A similarity between object shape can be measured in the shape space as a distance between two representations in the shape space. A single point p in the model by Murase, for example, encodes a specific pose of a specific object A under specific lighting conditions.

Geons: a set of geometric shape primitives proposed initially by Biederman 1987, including spheres, cylinders, cubes, cones etc.

Invariance and specificity: A representation r is invariant under a transformation t if the representation does not change when the transformation is applied to a stimulus. For example, view-invariance means that a (feature) representation remains constant for views of an object form different perspectives. Trivial invariance (like a constant representation for all views) can be avoided if the representation has a minimum variance. If a mapping between an applied transformation t and a representation exists, the representation is specific to t. For example, a desired property of representations for view-invariant object recognition is invariance to view point and specificity for object identity.

DETAILED DESCRIPTION OF EMBODIMENTS

The invention presents a mechanism for extracting geometric shape properties of objects from 2d images and image sequences. Additionally, the system can use visual or non-visual information for implementing a more general similarity measure. This extraction process is based on two-dimensional views but the system is largely independent of the specific view of the three-dimensional object during its operation phase. In a first phase, the training phase, the system extracts the relevant image statistics from unlabeled image sequences. The training phase uses an established algorithm based on the "slowness objective" for finding features that typically vary slowly or seldom in the training data set, e.g., Slow Feature Analysis (WisSej 2002), the trace rule (Foeldiak 1991) or temporal stability (Kayser 2001). Additional constraints guarantee that multiple non-trivial solutions (like the constant solution) are computed. The proposed system can use a single or multiple steps of optimizing the slowness objective, typically multiple steps are performed in a converging hierarchical layout as in (Franzius 2007a). In contrast to existing systems, supervised information can be used to adapt the features generated by the unsupervised optimization of the slowness objective (see later on) and information of physical properties of an object can be autonomously incorporated.

In the operation phase after the training phase, the system's output is a mapping M from 2d input views to a "shape feature space". This mapping is highly efficient because it can be instantaneously computed (in the mathematical sense), i.e., a single 2d input view will generate a single shape feature representation. The extracted features can form clusters in the shape space, so that different views of the same object produce similar features and similar views of distinct 3d objects are separated.

While this clustering property has been published earlier, a new quality is introduced here by identifying and using the interrelations of the cluster centers. Moreover, a mechanism for directly controlling these cluster distances is introduced. The extracted shape space can implement a similarity measure in 3d shape space rather than in 2d appearance space, as well as other similarity measures. Specifically, the system generalizes (i.e., produces meaningful results) to views of objects with shapes that have not been presented during the training phase. For example, if the system was trained with image sequences of two shapes (e.g., cube and sphere) and is applied to views of an intermediate shape (e.g., a morphed sphere-cube), the extracted features will have intermediate values between "cube" and "sphere". Thus, the extracted shape features of a view of an arbitrary shape characterize its shape meaningfully as a distance to the known shape cluster centers (e.g., 30% similarity to cube, 70% similarity to sphere).

Further developments of the present invention:

Alternative Input Data

The system is not limited to processing 2d views, alternatively or additionally 3d depth data (e.g., from laser scanners), multiple 2d views (e.g., from spatially separated cameras), and combinations of these are possible.

Preprocessing

Previous models like (Franzius 2007a; Franzius 2009) were only applied to artificial rendered data, whereas the proposed system has to be applied to real-world data as generated by a camera in possibly cluttered scenes. Therefore, typically a segmentation step will be performed for preprocessing of the raw image data.

Non-Rigid (Deformable) Objects

Optionally, non-rigid (deformable) objects can be recognized by the system. If, during the training phase, view sequences of an object undergoing non-rigid deformation are presented, the system can learn to associate the different configurations of the non-rigid object as a single shape. Such sequences could also be generated artificially, e.g., as morphs between shape A and B, in order to force the system into making shape representations of A and B more similar.

Learning Rate Adaptation

As the training data sequence determines the invariance properties of the model output (Franzius 2007a), the training data sequence needs to have certain properties in order for the model to produce view-invariant and shape-specific properties, e.g., objects should be visible for extended periods of time while they undergo rotation in depth, for example. If the movement properties of the training data set cannot be directly controlled during the training phase and the movement properties are not favorable for extracting view-invariant shape features (e.g., rapid switching between views of different objects), it is possible to control the learning rate such that learning only takes place during episodes of favorable movement (Franzius 2007a). This principle has been proposed before in the context of learning egocentric spatial codes.

Pose Learning

A possible extension to invariant shape recognition is pose and position extraction. Pose and position extraction is not new by itself (Franzius 2009), but gains a new quality for the generalized shape recognition introduced here.

Affordance Based Learning

Previous approaches considered some aspects of the movement statistics of objects for the invariance properties of a system based on optimizing the slowness objective (Franzius 2007a). However, no prior work has considered the movement statistics induced by the physical properties of objects in this context before. As an example, if one considers an object's movement after stimulation, e.g., by applying an impulse in one spatial direction, which causes a movement trajectory depending on the shape properties of the object. Some objects, like spherical objects, will move for extended time with relatively high speed, whereas other objects, e.g., of cube-like shape, will quickly cease to move. Given these movement trajectories, optimizing the slowness principle leads to different invariance and specificity properties for objects with different trajectories. Specifically, if the movement trajectories have the same maximum amplitude (e.g., if the object movement is constrained by a box) but different frequency (e.g., high for a sphere-like object and low for a cube-like object), the object-specific clusters will have diameters depending on this frequency. The higher the typical movement frequency of an object, the more compact the object-specific cluster will be in order to optimize the slowness objective while fulfilling a minimum variance constraint. Cluster diameters can afterwards be computed and interpreted in an unsupervised manner. Thus, the proposed system can autonomously and in an unsupervised manner build up a representation of objects based on their physical properties, e.g., shape. With such an ability, a system can autonomously learn about those relevant physical properties of previously unknown objects needed for interaction with the objects, e.g., for grasping or positioning objects at a desired position.

Integrating Supervised Information

It is possible to extend the unsupervised training phase and the operation phase by an intermediate supervised learning phase. The beginning of the training phase during which sequences of views are presented remains unchanged. At the end of the training phase, a new supervised training phase is inserted. In the case of implementing the slowness optimization with Slow Feature Analysis, this step is inserted after computing the covariance matrices of the data and the derivatives of the data but before diagonalizing the matrices for finding the optimally slow solutions.

The new supervised training phase serves for adapting the computed features to become more similar to a desired similarity measure. Given a similarity matrix S for some views (e.g., based on affordances, see below), the system adapts the feature representation computed by the slowness learning rule such that it becomes more similar to S. This is implemented by presenting view pairs (vi, vj) as "micro-sequences" to the system additionally to those from the unsupervised learning phase. Specifically, view pairs (vi, vj) with high similarity entries $s_{i,j}$ in S are shown to the system. Alternatively, all pairs (vi, vj) can be presented to the system, which adapts its learning speed proportionally to $s_{i,j}$. In the case of SFA, such a learning speed adaptation consists of weighting the updates to the covariance matrices of the data and the data derivatives by a factor proportionally to $s_{i,j}$, whereas gradient-descent based implementations can adapt their inherently present learning rate by multiplying it with a factor proportionally to $s_{i,j}$.

The similarity matrix is considered as a requirement to the system. As a result, distances of a pair of inputs a,b in the shape feature space should approximate: norm(S(a),S(b))~1/M(a,b).

This result is achieved by means of changing the temporal presentation order in a supervised way for some stimuli as explained herein. Thus, distances in shape space are to be measured and these distances approximate a desired and given similarity matrix S.

A main difference to other previously described methods is that the information from object trajectories is used to gather information on physical properties like object shape, whereas in previous work, movement trajectories of different objects were carefully chosen to be as similar as possible.

In known methods, no (or no systematic) temporal context between different objects exists in the training data. This is generally the case because switching objects before a camera takes time and in the meantime only background is present in a view. In theory, the relative positions of the cluster centers are arbitrary in this case, i.e., any permutation of cluster centers is an equally good solution of the slowness optimization. These possible permutations are effectively free and uncontrolled parameters of the system. In practical implementations, especially in hierarchical ones, these free parameters are set based on the uncontrolled and poorly understood properties of the intermediate representations. The supervised training phase proposed here fixes these previously undetermined free parameters of the representation in a meaningful way, i.e., to represent the desired similarity measure. The integration of S at this point is much more efficient than a later supervised classification because the setting of relative cluster distances requires only little additional information at this point of the learning process.

As an effect, the resulting feature representation can directly implement both view invariance, as learned from the temporal proximity of different views of identical objects during the training phase, as well as the desired similarity measure between objects. One example of such a desired similarity measure is a texture- and view-invariant shape space.

In the operation phase of the model presented by [Franzius, 2007, 2009], a supervised classification or regression can be performed, e.g., for view-invariant object classification. Such a step is still possible with the method proposed here. Nevertheless, the classifier can be simpler (e.g., linear) and needs less training data, which makes it more efficient, because the underlying feature space is better adapted for the classification task. Thus, only very few pairs of views (vi, vj) are needed to implement the desired similarity in the resulting feature space (and thus, for example, perform object classification).

If no pairs (vi, vj) are used for supervised learning, the system behaves as in [Franzius 2007, 2009]. If no slowness optimization is performed and all information is provided by the system in the form of distances of view pairs (vi, vj), the system effectively performs Fisher Discriminant Analysis (FDA). Thus, the proposed approach here implements a synthesis of both and combines the controllability of FDA with the power of the slowness objective to generate view-invariance.

Specific Forms of Similarity Matrices S

In principle, the similarity matrix S can have arbitrary meaning, visually related or not. A class of specifically relevant similarity matrices CS is related to physical function or affordances of an object or object class. This information can usually not be derived from purely visual data, i.e., the object appearance. We propose the following similarity measures implemented by S:

Physical properties of an object, including friction and movement type on a flat surface. Round objects can move extendedly on flat surfaces, whereas objects with sharp edges typically come to rest earlier. By measuring the average time of movement until an object comes to rest after pushing it, a similarity matrix S can be used to characterize physical shape and friction properties, which are highly important characteristics of objects for an autonomous system that needs to manipulate these objects. The measurement of such properties can be performed manually or by the autonomous system itself. In contrast to the completely autonomous approach of the previous section, this approach requires some additional programming for identifying the similarity matrix S.

Object categorization: Objects with distinct visual appearance but similar category membership can be clustered by the system if the similarity matrix S is based on category membership. For example, views of objects of similar color could have a high pair-wise similarity, as well as views of objects of similar size.

However, learning is restricted to cases where the objects' trajectories are influenced by other objects, which excludes cases of free rotation and extremely low friction.

Acquiring Relevant Features

Known methods choose features for object recognition either by hand-crafting a problem-specific feature set, or by choosing an appropriate problem-specific feature set from a pool of predefined features with a machine learning approach. These techniques are also applicable in a hierarchical fashion.

The invention is based on the existing approach of generating features automatically by computing weighted nonlinear combinations of the input channels such that the slowness objective is maximized. While this approach works well in many cases, there is no direct way of controlling the feature generation process. The invention proposes an optional mechanism to add a supervised influence on the feature generation process. If classes of specific properties are known to be relevant for the generation of the shape space, e.g., partial views showing corners or edges, these partial views can be used to train lower layers in the hierarchical model instead of (or additionally to) the full training views. In this way, the system can be trained to compute similar representations for each class of these partial views in lower layers, e.g., independently of viewing angle, lighting or texture.

Application Examples for the Proposed System

Automated shape recognition is a very basic tool that could be part of any apparatus with some degree of autonomy and sensing device (e.g., a camera).

Automatic sorting of objects by shape or other physical properties with invariance to lighting conditions, object pose and object surface (texture), based on visual data. Such a sorting could sort by shape similarity instead of a rigid pattern matching (e.g., round potatoes vs. elongated ones).

Recognition of shapes for robotics: an object's shape and pose determine how a robotic device can best grasp the object or perform arbitrary manipulations of the object.

Methods

The slowness goal function can be optimized directly on a sequence of raw 2d images. In most cases, however, the dimensionality of the input views is too high for computationally efficient optimization. In this case, a hierarchical model is applied, such that on the lowest layer small patches of the input views are used for the optimization. The outputs of some neighboring areas are then fed into the next layer, which again optimizes the same goal function, until the hierarchy converges to a certain resolution, or in the extreme case, to a single position.

Methods

Stimulus Generation

The model was trained with image sequences containing colored views of five different convex objects: sphere, cone, cube, pyramid, and cylinder. Two different input sets were used: "rendered" and "video". For the rendered data, the Visualization Toolkit (VTK) was used to render the views of the shaded objects in front of a homogeneous background either with or without textures. Additionally, test data was generated from "morphed" figures whose shape can be set as a gradual interpolation between any of the five training shapes. The object poses (configurations) for the training sequences were generated by a random walk procedure. To generate a configuration in the sequence we add a random term to the current spatial, angular, and scaling velocities of the object. The random term is drawn from an interval with a homogeneous probability density. The velocities are cut off at certain limits and by adjusting these limits one can effectively determine the transformation timescales. The position, angles, and scale are then updated according to these velocities. If an object reaches the position boundary, it is bounced back.

The whole procedure produces flat configuration histograms (given enough time points) and the velocity profiles are independent of the configuration values. In each step the object identity was changed with low probability (p=0.02). A blank frame was inserted if a switch took place to avoid linking together different objects in identical poses in the stimulus, which would introduce an element of supervised training.

For the video set, three variants of objects from paper and polystyrene foam were used. One variant was left white, whereas the others were textured. Additionally, a subset of the HRI50 database of everyday objects consisting of six soda cans, six rubber ducks, six cardboard boxes (e.g., for tea bags) and six sphere-like objects (e.g., a ball and an orange) has been used. The objects were held in hand in front of a camera in a cluttered office environment. Based on stereo camera depth cues and skin color detection, object views were segmented from the background before further processing as in (WersingKirsteinEtAl 2007). Due to fluctuations in the segmentation step, the object was not always perfectly segmented, centered, or scaled.

Slow Feature Analysis

Optimization problem: Given a function space F and an I-dimensional input signal x(t) find a set of J real-valued input-output functions $g_j(x) \in F$ such that the output signal $y_j(t) := g_j(x(t))$ minimize $\Delta y_j(t) := \langle y'_j{}^2 \rangle_t$ under the constraints
(1) $\langle y_j \rangle_t = 0$ (zero mean),
(2) $\langle y_j{}^2 \rangle_t = 1$ (unit variance),
(3) $\forall i<j: \langle y_i y_j \rangle_t = 0$ (decorrelation and order),
with $\langle \cdot \rangle$ and y' indicating temporal averaging and the derivative of y, respectively.

The Δ-value introduced above is a measure of the temporal slowness (or rather fastness) of the signal y(t). It is given by the mean square of the signal's temporal derivative, so that small Δ-values indicate slowly varying signals. The constraints (1) and (2) avoid the trivial constant solution and constraint (3) ensures that different functions $g_j$ code for different aspects of the input. Because of constraint (3) the $g_j$ are also ordered according to their slowness, with $g_1$ having the smallest Δ. In practical applications one typically uses only the first n solutions and discards the faster $g_j$, to control the dimensionality of the resulting data.

It is important to note that although the objective is slowness, the functions $g_j$ are instantaneous functions of the input, so that slowness cannot be achieved by low-pass filtering. Slow output signals can only be obtained if the input signal contains slowly varying features that can be extracted instantaneously by the functions $g_j$. Note also that for the same reason, once trained, the system works fast, not slowly.

The term "Slowly varying feature" refers to features generated by the optimization of a slowness learning rule, e.g., the delta value for Slow Feature Analysis. Thus, "slowly varying features" are a mathematically well-defined concept.

In the computationally relevant case where F is finite-dimensional the solution to the optimization problem can be found by means of Slow Feature Analysis (SFA) [WisSej 2002] and in a slightly different formulation in [BerkWisk 2005c]. This algorithm, which is based on an eigenvector approach, is guaranteed to find the global optimum. We use the SFA implementation in the open source MDP library (Modular toolkit for Data Processing) [MDP].

Network Setup

The computational model consists of a converging hierarchy of layers of SFA nodes. Each SFA node finds the slowest features from its input according to the SFA algorithm and performs the following sequence of operations: additive Gaussian white noise (with a variance of $10^{-6}$), linear SFA for dimensionality reduction, quadratic expansion, another linear SFA step for slow-feature extraction, and clipping of extreme values at ±4. The network is implemented in Python and all required elements (including the parallelization) are available in the MDP library (MDP).

BIBLIOGRAPHY

[Becker 1999]: S. Becker: Implicit learning in 3d object recognition: the importance of temporal context. Neural Computation, 11(2):347-374, 1999.

[BerkWisk 2005c]: P. Berkes and L. Wiskott: Slow feature analysis yields a rich repertoire of complex cell properties. Journal of Vision, 5(6): 579-602, 2005.

[Biedermann 1987]: I. Biedermann: Recognition-by-Components: A theory of human image understanding, Psychological review, 94(2): 115-147, 1987.

[Durou 2008]: J.-D. Durou, M. Falcone, and M. Sagona: Numerical methods for shape from shading: A new survey with benchmarks. Computer Vision and image Understanding, 109(1): 22-43, 2008.

[Einhauser 2005]: W. Einhaeuser, J. Hipp, J. Eggert, E. Koerner and P. Koenig: Learning view-point invariant object representations using a temporal coherence principle. Biological Cybernetics, 93:79-90, 2005.

[Foeldiak 1991]: P. Foeldiak: Learning invariance from transformation sequences. Neural Computation, 3:194-200, 1991.

[Franzius 2007a]: M. Franzius, H. Sprekeler, and L. Wiskott: Slowness and sparseness lead to place-, head-direction and spatial-view cells. PLoS Computational Biologz, 3(8):e166, 2007.

[Franzius 2009]: M. Franzius, N. Wilbert, and L. Wiskott. Invariant object recognition with slow feature analysis. Neural Computation, submitted, 2009.

[Hashimoto 2003]: W. Hashimoto: Quadratic Forms in Natural Images. Network: Computation in Neural Systems, 14(4): 756-788, 2003.

[Kayser 2001]: C. Kayser, W. Einhaeuser, O. Duemmer, P. Koenig and K. Koerding: Extracting slow subspaces from antural videos leads to complex cells. Artificial neural networks—ICANN 2001 Proceedings, 1075-1080, 2001

[MDP]: P. Berkes and T. Zito: Modular Toolkit for Data Processing (MDP), version 2.0. http://mdp-toolkit.sourceforge.net, 2005.

[Sprekeler 2007]: H. Sprekeler, C. Michaelis, L. Wiskott: Slowness: An objective for spike-timing dependent plasticity? PLoS Computational Biology, 3(6): e112, 2007

[Stringer 2002]: S. Stringer and E. Rolls: Invariant object recognition in the visual system with novel views of 3d objects. Neural Computation, 14:2585-2596, 2002.

[Stringer 2006]: S. Stringer, G. Perry, E. Rolls and J. Proske: Learning invariant object recognition in the visual system with continuous transformations. Biological Cybernetics, 94:128-142, 2006.

[Wallis 1997]: G. Wallis and E. Rolls: Invariant face and object recognition in the visual system. Progress in Neurobiology, 51(2): 167-194, 1997.

[WisSej 2002]: L. Wiskott and T. Sejnowski. Slow Feature Analysis: unsupervised learning of invariances. Neural Computation, 14(4): 715-770, 2002.

FURTHER REFERENCES

Mathias Franzius et al: "Invariant Object Recognition with Slow Feature Analysis" Artificial Neural Networks—ICANN 2008; Lecture Notes in Computer Science, Springer Berlin Heidelberg, vol. 5163. 3 Sep. 2008 (2008-09-03), pages 961-970, ISBN: 978-3-540-87535-2

Wolfgang Einhauser et al: "Learning viewpoint invariant object representations using a temporal coherence principle" Biological Cybernetics; Advances in Computational Neuroscience, Springer, Berlin, vol. 93, no. 1, 1 Jul. 2005 (2005-07-01), pages 79-90, ISSN: 1432-0770

Murase H et al: "Visual Learning and Recognition of 3-D Objects from Appearance" International Journal of Computer Vision, Kluwer Academic Publishers, Norwell, US, vo 14 no. 1, 1 Jan. 1995 (1995-01-01), pages 5-24, ISSN: 0920-5691

M. Franzius et al.: "Slowness and sparseness lead to place, head-direction, and spatial-view cells" PLOS Computational Biology, vol. 3, no. 8. August 2007 (2007-08), pages 1605-1622, Raytchev B et al: "Unsupervised recognition of multi-view face sequences based on pairwise clustering with attraction and repulsion" 1 Jul. 2003 (2003-07-01), Computer Vision and Image Understanding, Academic Press. US, pages 22-52, ISSN: 1077-3142

The invention claimed is:

1. A method for processing two-dimensional (2D) video signals from a video sensor, in order to extract three-dimensional (3D) shape information invariant to pose and lighting changes on at least one physical property about a physical object with its environment represented in the video signals, the method comprising the steps of:

in an unsupervised training phase, presenting, in an input field of a 2D video camera physical objects, used as 3D training objects, wherein different positions or a trajectory of each physical object is induced by a defined motion-including stimulus;

determining the physical properties of the 3D training objects from the object trajectory, wherein the physical properties include friction or movement type, wherein the trajectory is influenced by the shape of the physical object interacting with the environment;

extracting slowly varying features of different rotational views of the 3D training objects and forming clusters by clustering the extracted features in order to parameterize a shape space representation of the 3D training objects, the shape space being an abstract feature space encoding the 3D training objects' 3D shape properties;

providing storing, in a memory, the 3D training objects in a 3D shape space, the shape space being an abstract feature space encoding the 3D training objects' 3D shape properties; and in an operation phase, mapping a 2D video signal representation of a 3D training object in the shape space, the coordinates of the 3D training object in relation to centers of the formed clusters of the clustered extracted features in the shape space indicating a similarity of the 2D video signal representation of the physical object to the 3D shape or a physical property of the trained 3D training objects, wherein the coordinates of the 3D training object include a distance of the representation of the 3D training object in the shape space to the cluster centers.

2. The method according to claim 1, further comprising controlling a mechanical actuator to manipulate a physical object dependent on the similarity of the 2D video signal representation of the physical object to the 3D shape or a physical property of the trained 3D training objects.

3. A computing unit for an autonomous robot, comprising:
at least one processor; and
at least one memory including computer program code,
wherein the memory and the computer program code are configured to, with the processor, cause the computing unit to:

in an unsupervised training phase, present, in an input field of a 2D video camera physical objects, used as 3D training objects, wherein different positions or a trajectory of each physical object is induced by a defined motion-including stimulus;

determine the physical properties of the 3D training objects from the object trajectory, wherein the physical properties include friction or movement type, wherein the trajectory is influenced by the shape of the physical object interacting with the environment;

extract slowly varying features of different rotational views of the 3D training objects and forming clusters by clustering the extracted features in order to parameterize a shape space representation of the 3D training objects, the shape space being an abstract feature space encoding the 3D training objects' 3D shape properties;

provide storing, in a memory, the 3D training objects in a 3D shape space, the shape space being an abstract feature space encoding the 3D training objects' 3D shape properties; and in an operation phase, map a 2D video signal representation of a 3D training object in the shape space, the coordinates of the 3D training object in relation to centers of the formed clusters of the clustered extracted features in the shape space indicating a similarity of the 2D video signal representation of the physical object to the 3D shape or a physical property of the trained 3D training objects, wherein the coordinates of the 3D training object include a distance of the representation of the 3D training object in the shape space to the cluster centers.

4. An autonomous robot, being provided with at least one video sensor providing video signals to the computing unit according to claim 3, the computing unit controlling a mechanical object manipulator of the autonomous robot.

5. A non-transitory computer readable medium for storing instructions, which, when run on a computing device, perform:

in an unsupervised training phase, presenting, in an input field of a 2D video camera physical objects, used as 3D training objects, wherein different positions or a trajectory of each physical object is induced by a defined motion-including stimulus;

determining the physical properties of the 3D training objects from the object trajectory, wherein the physical properties include friction or movement type, wherein the trajectory is influenced by the shape of the physical object interacting with the environment;

extracting slowly varying features of different rotational views of the 3D training objects and forming clusters by clustering the extracted features in order to parameterize a shape space representation of the 3D training objects, the shape space being an abstract feature space encoding the 3D training objects' 3D shape properties;

providing storing, in a memory, the 3D training objects in a 3D shape space, the shape space being an abstract feature space encoding the 3D training objects' 3D shape properties; and in an operation phase, mapping a 2D video signal representation of a 3D training object in the shape space, the coordinates of the 3D training object in relation to centers of the formed clusters of the clustered extracted features in the shape space indicating a similarity of the 2D video signal representation of the physical object to the 3D shape or a physical property of the trained 3D training objects, wherein the coordinates of the 3D training object include a distance of the representation of the 3D training object in the shape space to the cluster centers.

* * * * *